(12) United States Patent
Curlander et al.

(10) Patent No.: US 10,304,175 B1
(45) Date of Patent: May 28, 2019

(54) OPTIMIZING MATERIAL HANDLING TASKS

(71) Applicant: Amazon Technologies, Inc., Seattle, WA (US)

(72) Inventors: James Christopher Curlander, Mercer Island, WA (US); Robert Alexander Colburn, Seattle, WA (US); Ryan Scott Russell, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 877 days.

(21) Appl. No.: 14/573,860

(22) Filed: Dec. 17, 2014

(51) Int. Cl.
  *G06T 7/00* (2017.01)
  *H04N 13/204* (2018.01)

(52) U.S. Cl.
  CPC ......... *G06T 7/0004* (2013.01); *H04N 13/204* (2018.05)

(58) Field of Classification Search
  CPC .............. G06T 7/0004; H04N 13/0271; H04N 13/0203
  See application file for complete search history.

(56) References Cited

U.S. PATENT DOCUMENTS

| | | | | |
|---|---|---|---|---|
| 2009/0313078 A1* | 12/2009 | Cross | ................. | G06K 9/00818 705/7.13 |
| 2013/0182114 A1* | 7/2013 | Zhang | ..................... | H04N 7/18 348/150 |
| 2013/0278635 A1* | 10/2013 | Maggiore | ............. | G06T 19/006 345/633 |
| 2014/0083058 A1* | 3/2014 | Issing | .................. | B65G 1/1378 53/473 |

OTHER PUBLICATIONS

Y. Kuniyoshi, M. Inaba and H. Inoue, "Learning by watching: extracting reusable task knowledge from visual observation of human performance," in IEEE Transactions on Robotics and Automation, vol. 10, No. 6, pp. 799-822, Dec. 1994.*

Gupta et al., "Human activities recognition using depth images", Proceedings of the 21st ACM international conference on multimedia, pp. 283-292, (Oct. 2013), also available at http://dl.acm.org/citation.cfm?id=2502099.

(Continued)

*Primary Examiner* — Joseph G Ustaris
*Assistant Examiner* — Jill D Sechser
(74) *Attorney, Agent, or Firm* — K&L Gates LLP

(57) ABSTRACT

Various examples are directed to systems and methods for utilizing depth videos to analyze material handling tasks. A material handling facility may comprise a depth video system and a control system programmed to receive a plurality of depth videos including performances of the material handling task. For each of the plurality of depth videos, training data may identify sub-tasks of the material handling task and corresponding portions of the video including the sub-tasks. The plurality of depth videos and the training data may be used to train a model to identify the sub-tasks from depth videos. The control system may apply the model to a captured depth video of a human agent performing the material handling task at a workstation to identify a first sub-task of the material handling task being performed by the human agent.

18 Claims, 18 Drawing Sheets

(56) References Cited

OTHER PUBLICATIONS

Lei, "Fine-grained kitchen activity recognition using RGB-D", Proceedings of the 2012 ACM Conference on Ubiquitous Computing, pp. 208-211 (Sep. 2012), Available at http://dl.acm.org/citation.cfm?id=2370216.2370248.

Saguna, "Complex Activity Recognition Using Context-Driven Activity Theory and Activity Signatures", ACM Transactions on Computer-Human Interaction (TOCHI), vol. 20(6), No. 32, 34 pages (Dec. 2013), Available at http://dl.acm.org/citation.cfm?id =2562181.2490832.

Ye et al., "A Survey on Human Motion Analysis from Depth Data", 39 pages, Available at http://www.iai.uni-bonn.de/~gall/download/jgall_survey_book13.pdf.

Zhao et al., "Combing RGB and Depth Map Features for Human Activity Recognition", 4 pages, Available at www.apsipa.org/proceedings_2012/papers/333.pdf.

* cited by examiner

OPTIMIZING MATERIAL HANDLING TASKS

BACKGROUND

Various suppliers, merchants, distributors, or other conveyors of goods, may operate material handling facilities to store and move items to satisfy received orders as part of a fulfillment network. For example, electronic marketplaces, such as those accessible via the Internet, may include a catalog of items or products available for purchase. These items may be offered as the basis for commerce (e.g., sale or trade). Customers may utilize a web browser to visit a merchant's website, select an item for purchase from the catalog, and engage in a checkout process to finalize an order for the item. The merchant may operate a fulfillment network including various material handling facilities in order to process these orders. For example, a material handling facility maintains an inventory of items, picks the ordered item or items from inventory, and prepares shipments of the purchased item. A shipment carrier receives the shipments from the merchant and delivers the shipments to the purchasing customers.

DETAILED DESCRIPTION

In the following description, reference is made to the accompanying drawings which illustrate several examples of the present invention. It is understood that other examples may be utilized and various operational changes may be made without departing from the spirit and scope of the present disclosure. The following detailed description is not to be taken in a limiting sense, and the scope of the examples of the present invention is defined only by the claims of the issued patent.

Various examples described herein are directed to utilizing depth video to recognize material handling tasks performed by an associate and sub-tasks thereof. For example, a material handling facility, or control system thereof, may capture a plurality of depth videos that show agents performing a material handling task. For each of the plurality of depth videos, the material handling facility, or control system thereof, may also receive data identifying sub-tasks of the material handling task and corresponding portions of the video including the sub-tasks. Using the depth videos and the identifying data, the material handling facility, or control system thereof, may train a classifier or other model to identify sub-tasks of the material handling task from depth video showing an agent performing the sub-tasks.

The trained classifier or model may be applied to depth videos to identify sub-tasks performed by the agent. This information may be used in various ways. For example, the material handling facility, or control system thereof, may identify a preferred order of sub-tasks within the material handling task. The preferred order of sub-tasks may be an order of sub-tasks that results in the efficient completion of the material handling task and/or the lowest likelihood of error. Also, for example, the material handling facility, or control system thereof, may identify a preferred variation in the material handling task, agent use or interaction with objects, the placement of objects during the task, etc. A preferred order of sub-tasks and/or preferred task variations may be communicated to the agent, for example, using a workstation feedback system.

Figure 1:
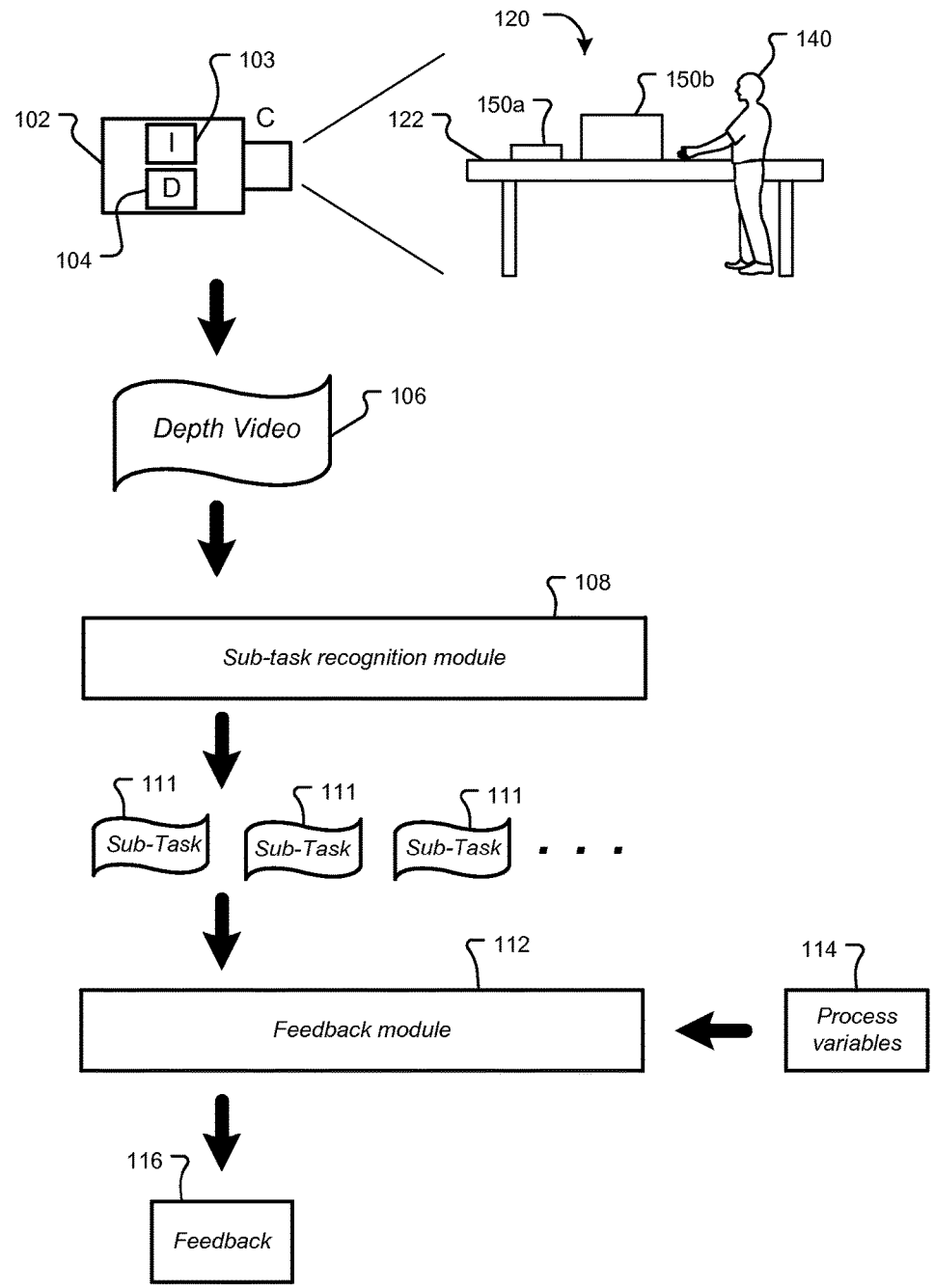
FIG. 1 is a diagram showing one example of a workflow for analyzing and optimizing material handling tasks.

The systems and methods described herein may utilize depth video to analyze and optimize material handling tasks performed by associates. FIG. 1 is a diagram showing one example of a workflow 100 for analyzing and optimizing material handling tasks. An agent 140 performs material handling tasks at a workstation 120. The workstation 120 may comprise a workstation surface 122 such as, for example, a table, desk, shelf or other surface. While performing a material handling task, the agent 140 may rest various objects 150a, 150b on the workstation surface 122. Objects 150a, 150b may include items to be shipped, boxes or other shipping containers, dunnage or other packing materials, etc. The agent 140 may perform any suitable material handling task including, for example, packing an item or items for shipment, stowing an item or items, restocking or re-binning an item or items, picking an item or items, sorting an item or items, packing and shipping an item or items, etc. Material handling tasks may comprise a fixed set of sub-tasks that are performed by the agent 140 in a regular order. For example, a material handling task that involves packing an order for shipment (e.g., a material packing task) may include at least the following example sub-tasks: (i) retrieving items making up the order; (ii) retrieving an appropriate shipping container; (iii) assembling the shipping container; (iv) scanning the retrieved items; (v) placing the scanned items in the shipping container; (vi) optionally, adding dunnage to the shipping container; (vii) sealing the shipping container; and (viii) passing the packed shipping container on to the next station.

A depth video system 102 may be positioned to view the workstation 120 and capture depth video 106 of the agent 140 performing material handling tasks. Depth video 106 may be video where some or all of the frames of the video are associated with corresponding depth data indicating the depth or proximity of objects in the video field-of-view to the depth video system 102. The depth video system 102 may comprise any suitable hardware for capturing depth video. For example, the depth video system 102 may comprise a separate image sensor 103 and depth sensor 104. The image sensor 103 may comprise any greyscale or color imaging device such as, for example, a charge coupled device (CCD) array or any other suitable image sensor and/or optics. The depth sensor 104 may be any suitable type of sensor capable of determining a distance from the sensor to objects in its field-of-view. For example, the depth sensor 104 may comprise a LIDAR, sonar or other suitable transmitter and receiver. The depth of objects in the field-of-view may be determined based on the time required for an echo to return to the depth sensor. In some examples, the depth video system 102 may comprise an image sensor and an infrared projector. The infrared projector may project an infrared pattern on the field of view. The image sensor may be sensitive to infrared light and may utilize the pattern to derive depth information from images captured by the image sensor (e.g., frames of the depth video). In some examples, the depth video system may comprise a pair of stereoscopic cameras, a time-of-flight camera, a plenoptic or light-field camera, etc. In some examples, the depth video system 102 may be or comprise any suitable Red Green Blue plus Depth (RGB-D) system, including, for example, the Xtion PRO LIVE system available from ASUSTek Computer Inc., the Kinect RGB-D sensor available from Microsoft, Inc., etc.

The depth video 106 may be provided to a sub-task recognition module 108. The sub-task recognition module 108 may execute a classifier trained to identify portions of the depth video 106 showing sub-tasks for different material handling tasks, for example, as described herein. The sub-task recognition module 108 may be executed by a control system of the material handling facility, such as the control system 202 in FIG. 2, or other suitable hardware. An output of the sub-task recognition module 108 may include constituent videos 111. Each constituent video 111 is a portion of the depth video 106 showing the agent 140 performing a particular sub-task of the material handling task. Constituent videos 111 may be completely separate videos or may, for example, comprise one or more pointers to the depth video 106 showing where the agent 140 transitions from one sub-task to another.

The constituent videos 111 may be received by a feedback module 112, which may derive task feedback 116. Task feedback 116 may indicate things that the agent 140 can do to improve the material handling task. Errors may include any type of error that the agent 140 may make while performing the material handling task including, for example, generating an incorrect output (e.g., packing the wrong item, using the wrong container, etc.), performing a sub-task in a dangerous or non-ergonomic manner, etc. Task feedback 116 may also include factors differentiating a particular material handling task from other similar tasks. For example, task feedback 116 may include an indication that a material handling task is different than similar tasks. The feedback module 112 may also be executed by the control system of the material handling facility (e.g. control system 202 in FIG. 2) or by other suitable hardware.

In some examples, the feedback module 112 may operate based on inputs 114 in addition to the constituent videos 111. Example inputs include, process variables such as an identification of objects (e.g., items, containers, etc.) scanned during the material handling task; measured weights of objects handled during the material handling task; feedback received from the agent 140 during the material handling task such as, for example, items scans, etc.

Figure 2:
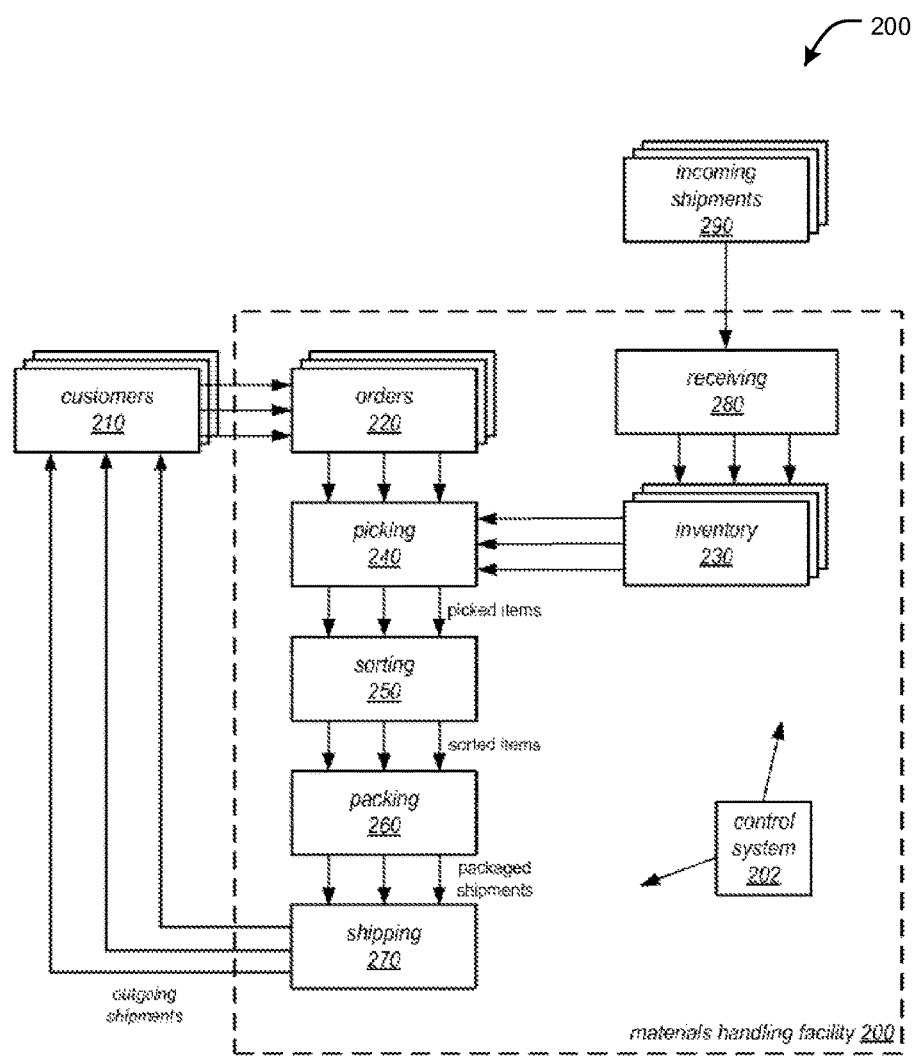
FIG. 2 is a block diagram showing a logical representation of one example of a materials handling facility.

FIG. 2 is a block diagram showing a logical representation of one example of a materials handling facility 200. In various examples, a fulfillment network including multiple materials handling facilities (each of which may be configured in a manner similar to that of materials handling facility 200) may be responsible for fulfilling multiple orders, such as orders placed through an electronic commerce ("e-commerce") portal.

In various examples, a materials handling facility 200 may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, FIG. 2 shows an order fulfillment center of a product distributor. Multiple customers 210 may submit orders 220 to the product distributor through an ecommerce portal or other electronic marketplace, where each order 220 specifies one or more items from inventory 230 to be shipped to the customer that submitted the order. To fulfill the customer orders 220, the one or more items specified in each order may be retrieved, or picked, from inventory 230 (which may also be referred to as stock storage) in the materials handling facility, as indicated at 240. Picked items may be delivered or conveyed, if necessary, to one or more workstations in the materials handling facility for sorting 250 into their respective orders, packing 260, and shipping 270 to the customers 210.

Each item stored in inventory 230 may include an item identifier. The term item identifier may refer to a unique identifier associated with each particular type of item carried in inventory 230 of a materials handling facility 200. Multiple items of the same type of item may be carried in inventory 230. Typically, but not necessarily, each item is tagged or otherwise marked with the item identifier. For example, units or collections of items in inventory may be marked or tagged with a bar code, Universal Product Code (UPC), Stock-Keeping Unit (SKU) code, serial number, and/or other designation (including proprietary designations) that may be used as item identifiers to facilitate material handling tasks, including, but not limited to, stowing, restocking or re-binning, picking, sorting, packing and shipping. These designations, or codes, may identify items by type, and/or may identify individual items within a type of item.

Cases, boxes, bundles, or other collections of items may similarly be marked or tagged with item identifiers. The items in a collection may all be of the same type of item, for example a case of twelve items of a particular item type, or may be a collection of one or more items of each of two or more heterogeneous item types. A collection of item(s) (e.g., a case containing twelve items, or a bundle containing one or more items of each of two or more heterogeneous item types, such as a boxed or bundled set of three different books) may thus be considered or treated as an "item" in the materials handling facility 200. A designation, or code, may thus also identify a collection of items as an "item" in the order fulfillment process. Thus, various processes, in addition to sorting individual items, may also process a collection of items designated as an item. Therefore, the conveyance receptacles described herein may receive collections of items that are designated as an item as well as individual items.

As noted above, in various examples, picked items may be delivered to an induction workstation. Induction workstations (e.g., agents working at induction workstations) may perform various material handling tasks. For instance, at the induction station, individual items may be associated with and placed into particular conveyance receptacles. Conveyance receptacles may include containers, modules, bins, slots or other receptacles for containing groups of items together. The item may be associated with the particular conveyance receptacle into which it is placed. In some examples, the association of an item with a particular conveyance receptacle may be performed by reading, scanning or otherwise entering an item identifier associated with the item and a conveyance receptacle identifier associated with the particular conveyance receptacle into which the unit is placed. The item identifier and receptacle identifier may be communicated to control system 202 of the materials handling facility via wired and/or wireless communications. Each conveyance receptacle may include a unique conveyance receptacle identifier that uniquely identifies the particular conveyance receptacle in the materials handling facility. The conveyance receptacle identifier may, for example, be indicated by a bar code, Radio Frequency Identifier (RFID) device, or some other scannable or readable mechanism, mark, or tag attached to or integrated with the conveyance receptacle.

In some examples, the conveyance receptacles may then be routed to particular destinations for the items contained within the receptacles in accordance with the requests (orders 220) currently being processed. For example, sorting workstations may be implemented to sort items into respective orders. Streams or batches of incoming items may arrive at a sorting station and be grouped or placed in respective containers, modules, bins, slots, or other receptacles corresponding to a particular order. In some examples, various material handling tasks, similar to those described herein with induction may be performed, such as reading, scanning or otherwise entering an item identifier associated with the item and a sorting receptacle identifier associated with the particular sorting receptacle into which the unit is placed. In some examples, robotic or automated transport systems may convey items in shelving units or other vertical storage containers with multiple slots for storing items. A material handling task may be taking items from or placing items into the vertically oriented storage containers.

An order may then proceed to a packing workstation, in some examples, to be packaged for shipping 270, under direction of a control system 202. At each packing workstation, shipments of items (e.g., shipment) may be packed into a respective shipping container (e.g., corrugated box or other shipping container) for shipment from the materials handling facility. Prepared shipments may be processed at shipping 270 and conveyed to a shipment carrier for delivery to respective customers. A picked, packed and shipped order does not necessarily include all of the items ordered by the customer; an outgoing shipment to a customer may include only a subset of the ordered items available to ship at one time from an inventory storage location.

The materials handling facility 200 may also include a receiving 280 operation for receiving shipments 290 of stock (e.g., units of inventory items) from one or more sources (e.g., vendors) and for moving or "stowing" the received stock into stock storage or inventory 230. The receiving 280 operation may also receive and process returned purchased or rented items or orders from customers. At least some of these items are typically returned to inventory 230. The various operations of a materials handling facility may be located in one building or facility, or alternatively may be spread or subdivided across two or more buildings or facilities. In various instances, it should be understood that references to elements, units, items, processes (or anything else) as being located within materials handling facility 200 may be extended to encompass elements, units, items, processes (or anything else) associated with the materials handling facility 200, though not physically located within materials handling facility. For example, various elements, units, items, or processes (or anything else) may be implemented outside of the materials handling facility.

In various examples, shipments of one or more items at shipping 270 may be transferred to one or more shipment carrier network(s). Each shipment carrier's network may include one or more distribution facilities for storing items as well as vehicles for conveying shipments from such distribution facilities and/or materials handling facilities (such as materials handling facility 200) to various destinations (e.g., customer specified destinations such as home or business addresses).

A materials handling facility may include a control system 202 which may include, but is not limited to, one or more computer systems, one or more data storage devices, one or more wired and/or wireless networks, control system software (programs, modules, drivers, user interfaces, etc.), and suitable servers or other hardware to execute the control system software. An exemplary computer system that may be used in a control system 202 to execute control system software is illustrated in FIG. 13.

Control system 202 may manage or direct the performance of various operations, processes, or material handling tasks in materials handling facility 200 to efficiently utilize resources of the materials handling facility without exceeding known constraints of the materials handling facility. For example, control system 202 may manage the flow of items throughout materials handling facility 200. In some examples, control system 202 may direct or monitor the performance of various other systems in materials handling facility 200, such as a workstation feedback system described below. Also, in some examples, the control system 202 may execute the sub-task recognition module 108 and/or feedback module 112 described herein with respect to FIG. 1.

Figure 3:
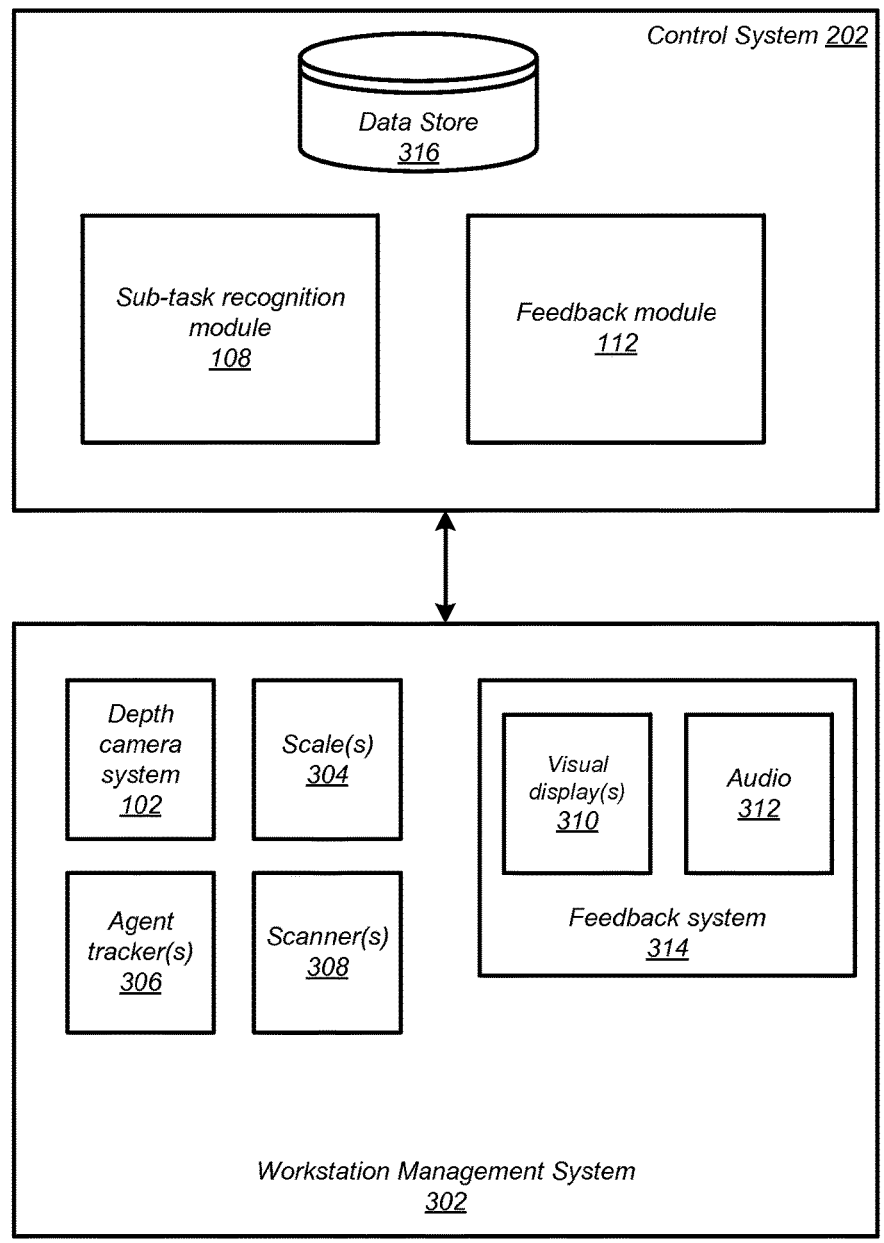
FIG. 3 is a block diagram showing one example of a control system and a workstation management system that interface with one another.

FIG. 3 is a block diagram showing one example of a control system 202 and a workstation management system 302 that interface with one another. The workstation management system 302 may include various devices present at individual workstations to facilitate analyzing and optimizing material handling tasks. For example, the workstation management system 302 may comprise the depth camera system 102 described herein above as well as one or more scales 304, one or more sensor(s) 306, one or more scanners 308, etc. Scales 304 may be utilized to weigh items, packing containers and/or other objects at various points during material processing tasks. For example, measured weights may be compared to expected weights to detect errors in the material processing tasks. Sensors 306 may comprise sensors configured to determine the location of an agent at a workstation. For example, sensors 306 may comprise proximity sensors, cameras, etc. In some examples, sensors 306 may be omitted and agent position may be derived from the depth video.

One or more scanners 308 may be utilized by the agent to provide the control system 202 with information describing objects utilized during material handling tasks. For example, the agent may scan items that are picked, packed, etc. to verify correctness. The agent may scan packing containers used to pack items and/or other objects used in material handling tasks. Scanners 308 may include one or more hand-held, mobile and/or fixed readers, scanners or scanning devices that may be able to scan, receive, or otherwise detect the marks or tags (e.g., bar codes, radio frequency identification (RFID) tags, etc.) on individual items or collections of items (e.g., cases). Scanners 308 may be configured to communicate with a control station or stations of the control system 202 to, for example, determine and record the item and/or item type of the items. The hand-held, mobile and/or fixed readers, scanners or scanning devices may also be able to scan, receive, or otherwise detect the marks or tags (e.g., bar codes, radio frequency identification (RFID) tags, etc.) attached to or integrated with the conveyance receptacles.

The workstation management system 302 may also include a feedback system 314. The feedback system 314 may provide the agent with visual and/or audio feedback such as, for example, task feedback 116 derived from the depth video 106 and constituent videos 111 (FIG. 1). The feedback system 314 may include any suitable mechanism for providing feedback to the agent. For example, the feedback system 314 may comprise a visual display device 310 and/or an audio output 312. The visual display device 310 may comprise a projector, a screen, or any other suitable type of display. In some examples, the visual display device 310 may also comprise one or more lights (light emitting diodes (LEDs) or other lights). The audio output 312 may comprise any suitable type of speaker, buzzer, siren or other audio output.

Although one workstation management system 302 is shown, various material handling facilities 200 may comprise workstation management systems 302 at multiple workstations (e.g., all workstations in the material handling facility 200). Some instances of workstation management systems 302 may include less than all of the components shown in FIG. 3, while other instances may include additional components not shown in FIG. 3. The workstation management system 302 (and additional workstation management systems) may be in communication with the control system 202 of the material handling facility 200, for example, via a suitable network of the control system 202. As illustrated in FIG. 3, the control system 202 may be programmed to implement the sub-task recognition module 108 and feedback module 112 described herein. The control system 202 may also comprise a data store 316. The data store 316 may comprise one or more hardware storage devices and may be configured to store various data regarding material processing tasks such as, characteristics related to various material processing tasks or sub-tasks (e.g., elapsed time for particular sub-tasks, actions involved for particular sub-tasks, objects or items utilized in particular sub-tasks, etc.), depth videos 106, constituent videos 111, process variables 114, task feedback 116, data from one or more scales 304, data from one or more sensor(s) 306, data from one or more scanners 308, historical records of material processing task feedback, etc.

Figure 4:
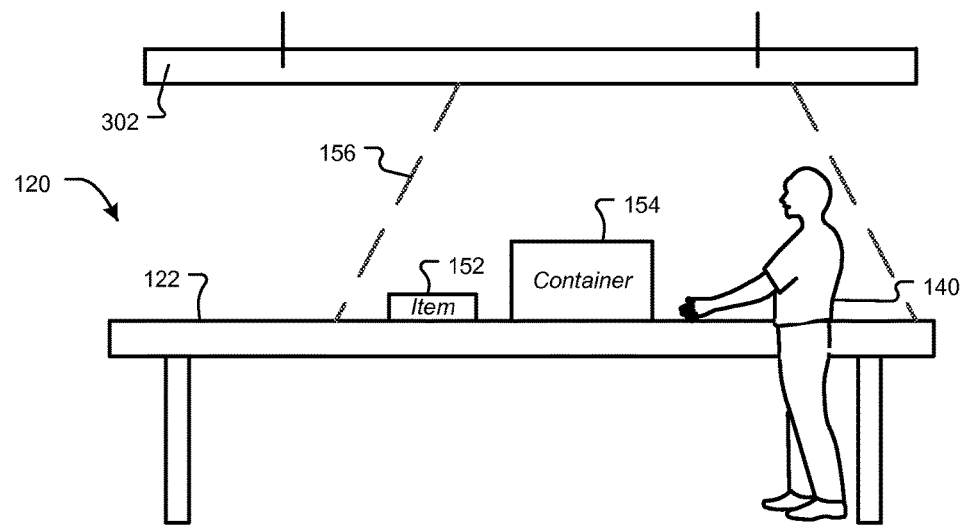
FIG. 4 shows one example of a workstation comprising a workstation management system.

FIG. 4 shows one example of a workstation 120 comprising a workstation management system 302. An example field-of-view 156 of the depth video system 102 is shown to encompass the agent 140, and the objects 152, 154 that are part of the material handling task. In some examples, all or part of the workstation management system 302 is fixed at a particular location, as illustrated in FIG. 4, such as mounted or located above the workstation surface 122. Some components of the workstation management system 302, such as scanners 308, some displays 310, etc., may be positioned away from the fixed or mounted location.

Figure 5:
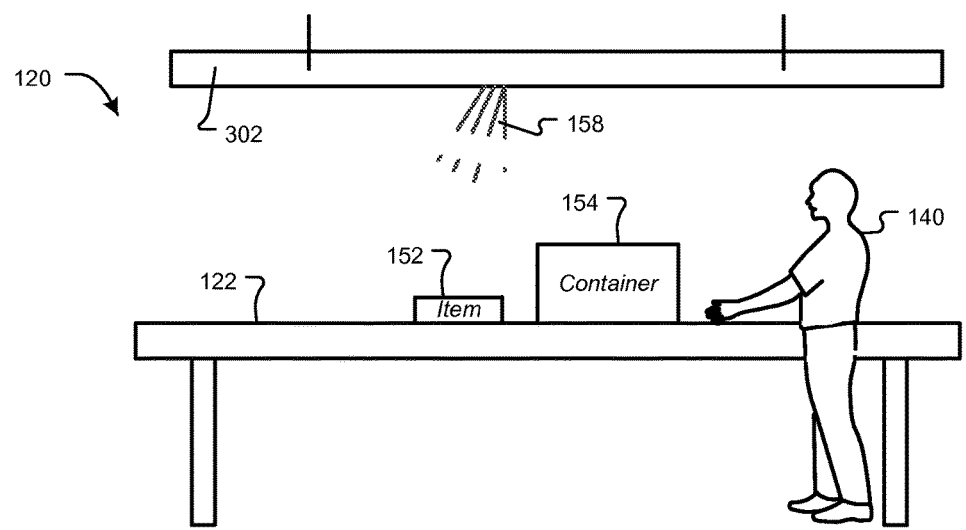
FIG. 5 shows one example of the workstation of FIG. 2 where the workstation management system is providing feedback in the form of a projected image.
Figure 6:
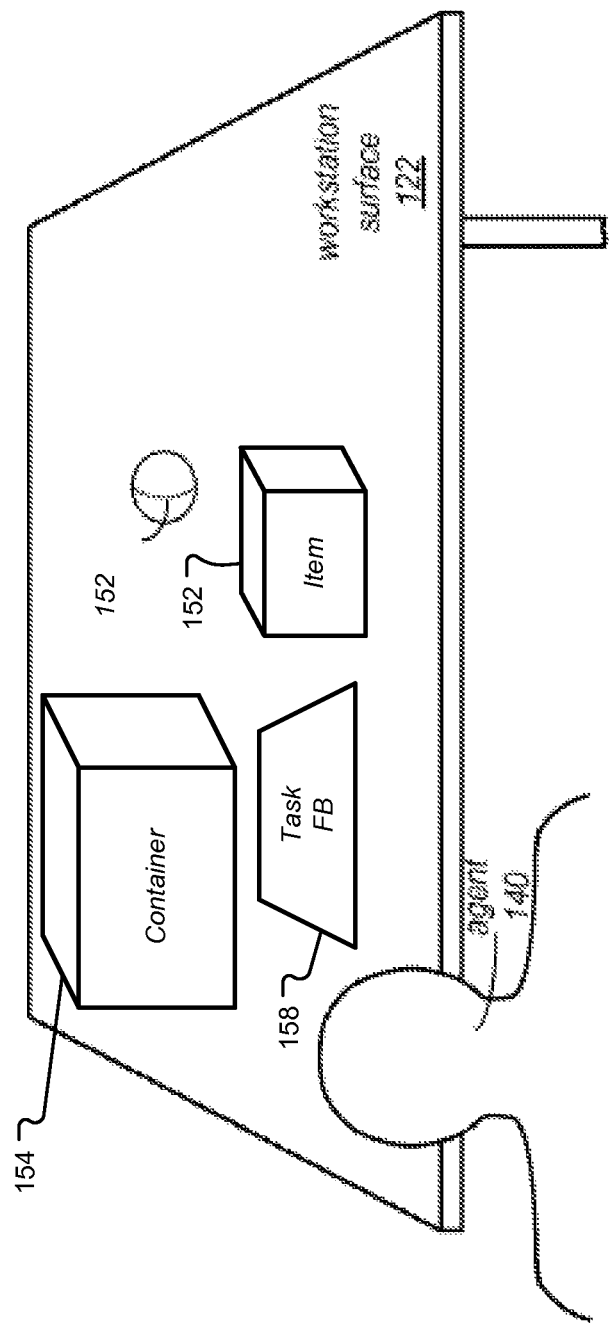
FIG. 6 shows an alternate perspective of one example of the workstation of FIG. 2 showing the projected image directly on the workstation surface.

FIG. 5 shows one example of the workstation 120 where the workstation management system 302 is providing feedback in the form of a projected image 158. The projected image 158 may originate from a projector or other suitable visual display device of the workstation management system 302 (See 310 in FIG. 3). The projected image 158 may be positioned to appear, as described herein, on an object at the workstation surface 122 (e.g., an item 152 or container 154), on the surface 122 itself, on the agent 140, or at any other suitable location. FIG. 6 shows an alternate perspective of one example of the workstation 120 showing the projected image 158 directly on the workstation surface 122.

Figure 7:
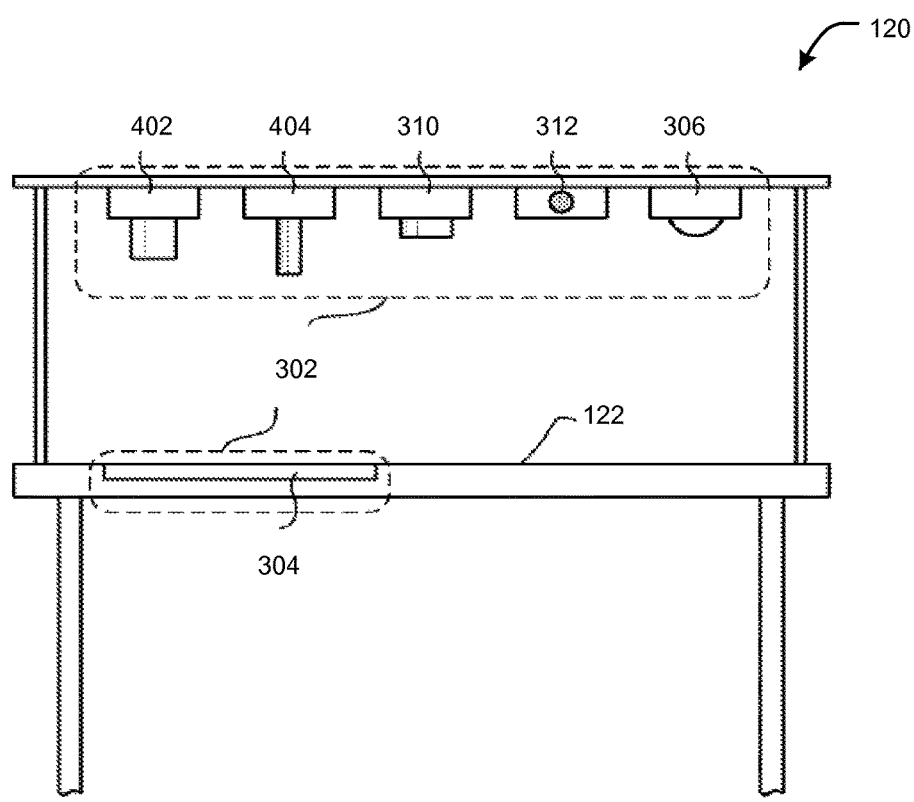
FIG. 7 is a diagram illustrating another example workstation and workstation management system.

FIG. 7 is a diagram illustrating another example workstation 120 and workstation management system 302. A depth video system is implemented with an image sensor 402 and depth sensor 404, although any suitable sensor or combination of sensors may be used, as described above. A visual display device 310 may take the form of a projector that can project an image, such as the projected image 158, on the workstation surface 122. An audio feedback device 312 may comprise a speaker. A scale 304 may be positioned on the surface 122 of the workstation 120 to allow an agent to place objects on the scale 304 for weighing.

Figure 8:
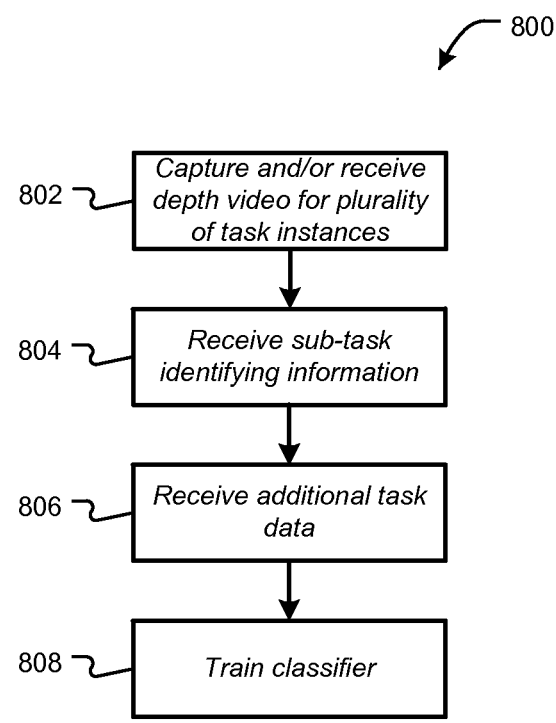
FIG. 8 is a flowchart showing one example of a process flow that may be executed by one or more workstation management systems and the control system to configure the sub-task recognition module.

As described herein, the sub-task recognition module 108 may be configured to discern portions of depth videos (e.g., constituent videos 111) that show agents performing specific sub-tasks. In some examples, the sub-task recognition module 108 may do this by utilizing a classifier or other suitable model. FIG. 8 is a flowchart showing one example of a process flow 800 that may be executed by one or more workstation management systems 302 and the control system 202 to configure or train a classifier or other suitable model for use by the sub-task recognition module 108. At 802, the control system 202 may capture and/or receive depth video for a plurality of instances of an agent executing a material handling task. The depth videos may be of the same material handling task or a similar task. For this reason, the captured depth videos may show the same or similar sub-tasks. In various examples, depth videos may be captured with objects of interest in the field-of-view of the depth video system. For example, each depth video may show the agent performing the material handling task as well as any objects that are used in the material handling task. The depth videos may depict a single agent performing the material handling task at a single workstation. In some cases, however increasing the number of work stations and agents depicted in the depth videos may increase the accuracy of the resulting classifier or other model. Accordingly, in some examples, the depth videos may include videos depicting multiple different workstations with the material handling task performed by multiple different agents. Any suitable number of agents and/or workstations may be depicted.

At 804, the control system 202 may receive training data. The training data may identify portions of the captured depth videos in which the agent or agents perform a particular sub-task. For example, a user or users may view the depth videos and identify the sub-tasks being performed. Training information may include indications of sub-tasks, indications of actions involved in sub-tasks, indications of items or other objects utilized in sub-tasks, and/or indications of locations in a depth videos where the sub-tasks are performed.

At 806, the control system 202 may receive additional task data. The additional task data may include any other data about the material handling task. For example, additional task data may include data describing the agent or agents performing the data such as, weight, height, arm span, dominant hand, etc. The additional task data may also include data describing objects used in the material handling task. These may include items packed, shipped or picked; shipping containers; receptacles for transporting picked items; etc. The objects may be identified when scanned by the agent using a scanner.

At 808, the control system 202 may generate and/or train a classifier. The classifier may be generated according to any suitable pattern recognition algorithm. Example pattern recognition algorithms that may be used include support vector machine algorithms, neural network algorithms, deep convolutional neural network algorithms, genetic algorithms, classification tree algorithms, recursive Bayesian models, random decision forest algorithms, etc. The classifier may be configured to consider any suitable data included in or provided in addition to the depth videos. For example, from the depth videos, the classifier may be configured to consider depth data, color data, sizes of objects, spatial relationships between objects, etc. Also, for example, the classifier may be configured to consider the sub-task identifying information received at 804 and/or the additional task data received at 806. Upon configuration, the sub-task recognition module 108 may be capable of receiving a single depth video of a material handling task, such as the depth video 106 of FIG. 1, and generating constituent videos 111 showing sub-tasks.

Figure 9:
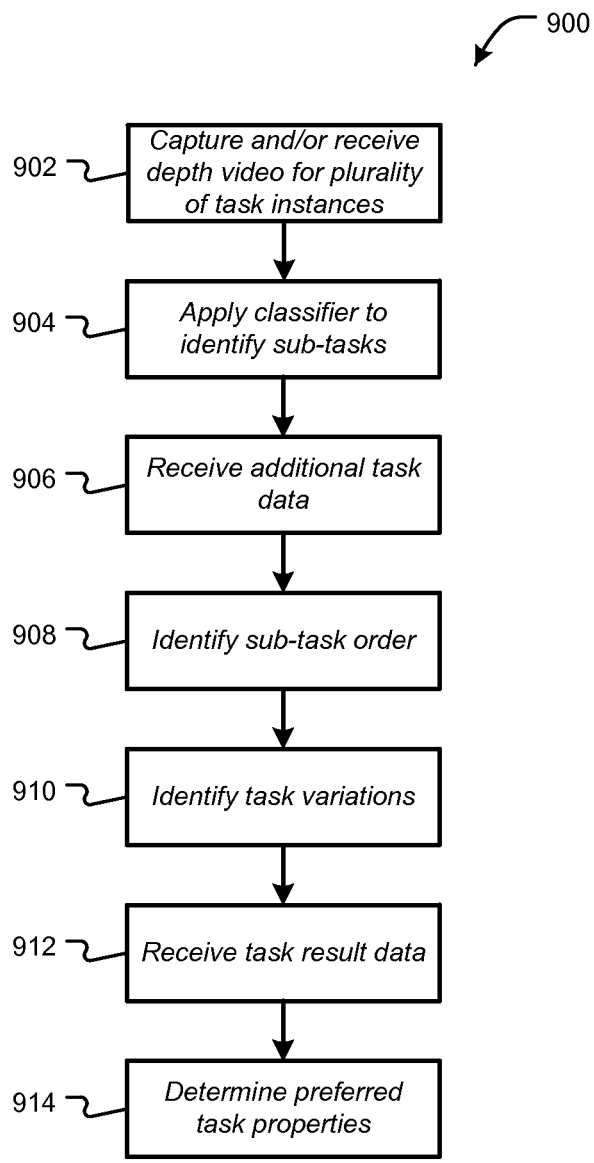
FIG. 9 is a flow chart showing one example of a process flow that may be executed by the control system to analyze the performance of material handling tasks.

The feedback module 112 may utilize the output of the sub-task recognition module 108 to analyze and improve and/or optimize the performance of material handling tasks. For example, FIG. 9 is a flow chart showing one example of a process flow 900 that may be executed by the control system 202 (e.g., the feedback module 112 and the sub-task recognition module 108) to analyze the performance of material handling tasks. At 902, the control system 202 may capture and/or receive depth video for a plurality of instances of a material handling task. The depth videos may be of the same material handling task or of similar material handling tasks. In some examples, as described above, the depth videos may include videos depicting multiple agents performing the material handling task at multiple different work stations. Any suitable number of agents and/or work stations may be depicted. At 904, the control system may utilize the sub-task recognition module 108 to identify constituent videos, where each constituent video shows a sub-task of the material handling task.

At 906, the control system 202 (e.g., the feedback module 112) may receive additional task data, for example, as described herein above at 806. At 908, the control system 202 (e.g., the feedback module 112) may identify differences in the order of sub-tasks. Not all of the instances of the material handling task captured by the depth videos of 902 may show agents performing sub-tasks in precisely the same order. For example, some agents packing an order for shipment may retrieve a shipping container after scanning the items to be shipped, or vice versa. At 910, the control system 202 may identify task variations. Task variations may be differences in the way that an agent or agents performs sub-tasks over different instances of the material handling task. Task variations may be derived from constituent videos or from any other suitable source.

At 912, the control system 202 may receive task result data. Task result data may indicate the results of the material handling tasks shown in the depth videos from 902. Task result data may include, for example, the length of time required for the task and for each constituent sub-task and whether the agent erred in performing the task. Task result data may be derived from the depth videos, or constituent videos. For example, the length of time required for the task and each sub-task may be determined by counting frames in depth video and constituent videos. Other task data may be received from other portions of the control system 202 or workstation management systems 302. For example, errors in the performance of a task may be determined if a shipping container weighed on a scale 304 at a workstation does not match an expected weight.

At 914, the control system 202 (e.g., the feedback module 112) may determine preferred task properties. Preferred task properties may include, for example preferred sub-task orders, preferred task variations and/or performance alerts. A preferred sub-task order or orders may indicate one or more orders for performing sub-tasks making up the material handling task.

Figure 10:
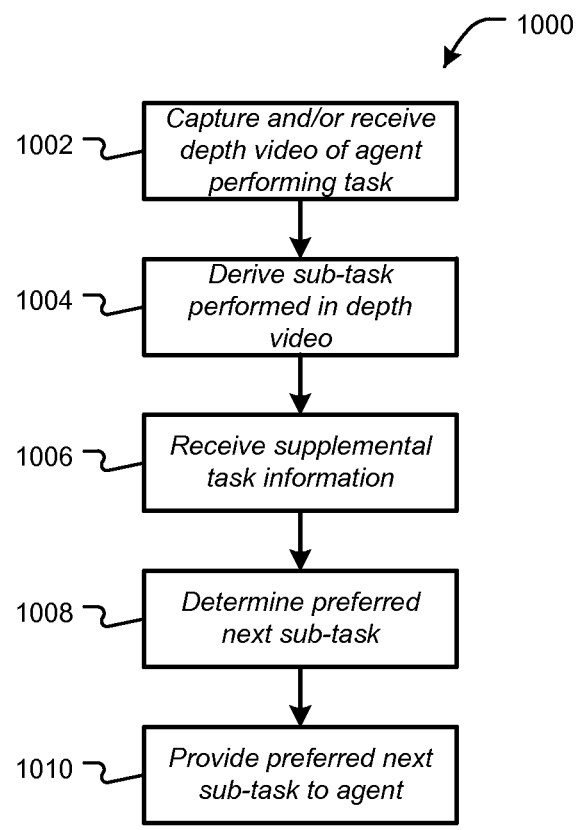
FIG. 10 is a flow chart showing one example of a process flow that may be executed by the control system and/or the workstation management system to optimize a material handling task.

FIG. 10 is a flow chart showing one example of a process flow 1000 that may be executed by the control system 202 and/or the workstation management system 302 to optimize a material handling task. At 1002, the control system 202 may capture and/or receive a depth video, such as depth video 106, showing an agent performing a task at a workstation. The depth video may be different than the depth videos used to generate the classifier (e.g., process flow 800) and/or determine preferred task properties (process flow 900). At 1004, the control system 202 (e.g., the sub-task recognition module 108) may identify sub-tasks in the depth video, for example, by identifying constituent videos. At 1006, the control system 202 may receive additional task data, for example, as described above. At 1008, the control system 202 may determine a preferred next sub-task. The preferred next sub-task may be a next sub-task in a preferred sub-task order, for example, as determined according to the process flow 900 above. The preferred next sub-task may be communicated to the agent, at 1008, for example, utilizing the feedback system 314 described herein.

Figure 11:
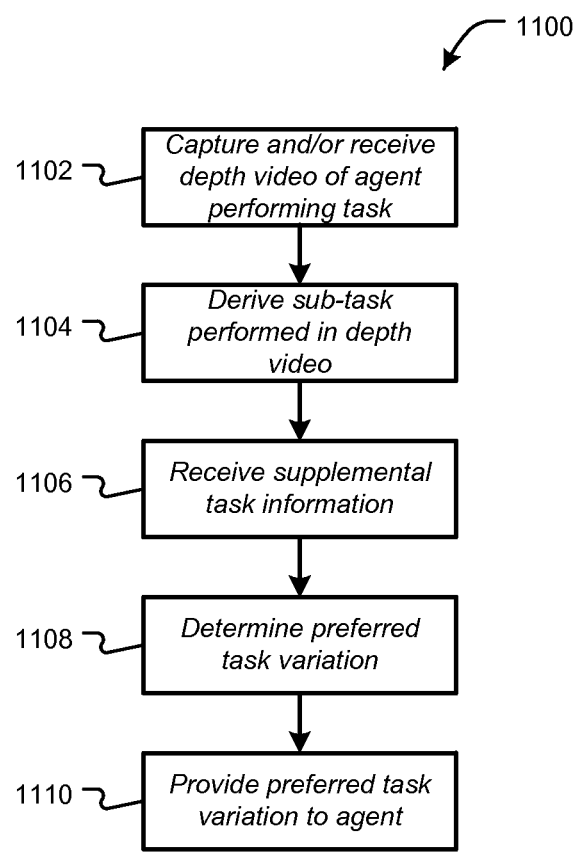
FIG. 11 is a flow chart showing another example of a process flow that may be executed by the control system and/or the workstation management system to optimize a material handling task.

FIG. 11 is a flow chart showing another example of a process flow 1100 that may be executed by the control system 202 and/or the workstation management system 302 to optimize a material handling task. At 1102, the control system 202 may capture and/or receive a depth video showing a performance of a material handling task. At 1104, the control system 202 (e.g., the sub-task recognition module 108) may identify one or more sub-tasks being performed in the depth video, as described herein. Additional task information may be received at 1106. At 1108, the control system 202 may determine a preferred task variation, for example, for the next sub-task to be performed. At 1110, the preferred task variation may be provided to the agent, for example, utilizing the feedback system 314 described herein.

Figure 12:
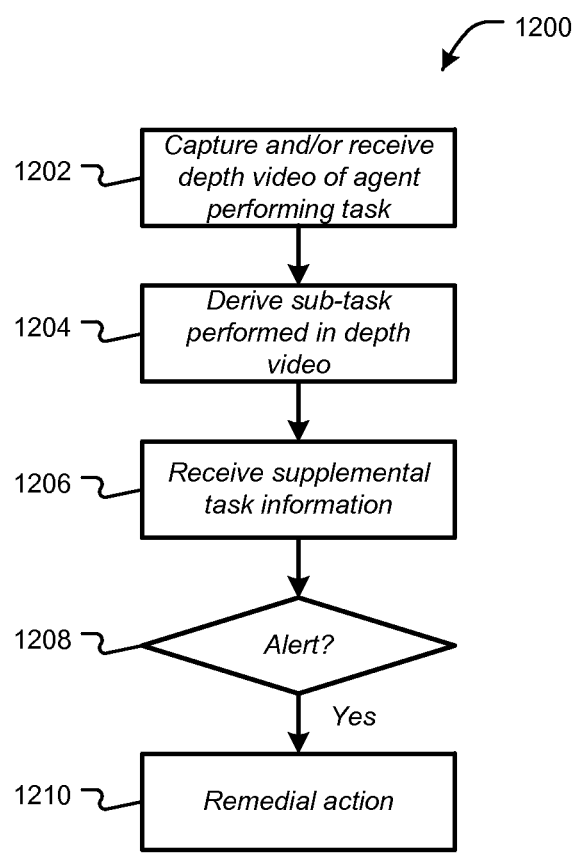
FIG. 12 is a flow chart showing another example of a process flow that may be executed by the control system and/or the workstation management system to optimize a material handling task.

FIG. 12 is a flow chart showing another example of a process flow 1200 that may be executed by the control system 202 and/or the workstation management system 302 to optimize a material handling task. At 1202, the control system 202 (and/or workstation management system 302) may capture and/or receive a depth video showing an agent performing a material handling task. At 1204, the control system 202 (e.g., the sub-task recognition module 108) may identify one or more sub-tasks being performed in the depth video, as described herein. Additional task information may be received at 1206. At 1208, the control system 202 may determine whether a performance alert is present. For example, the control system 202 may determine if the depth video and/or additional task information exhibit a sub-task order or task variation that correlates to an error or slow performance, as described above with respect to FIG. 9.

FIGS. 13A-13F are diagrams showing different visual feedback being provided to an agent at a pack workstation 500, according to some examples. For example, the visual feedback may indicate a preferred next sub-task and/or a preferred task variation. The pack workstation 500 is configured to allow an agent 525 to perform a material handling task. In the example of FIGS. 13A-13F, the material handling task is a packing process to pack items 570 into a shipping container. Items 570 are located on a pack station surface 540 for performance of the packing process. Visual feedback system 510 (or a portion thereof) may be implemented in a fixed position above workstation surface 540. Agent 525 packs items into shipping containers and places the packed container 590 onto conveyer mechanism 580 to be conveyed to another location in a materials handling facility. Container inventory 530 may include shipping containers of varying sizes and/or properties that may be used to perform the packing process.

Figure 13A:
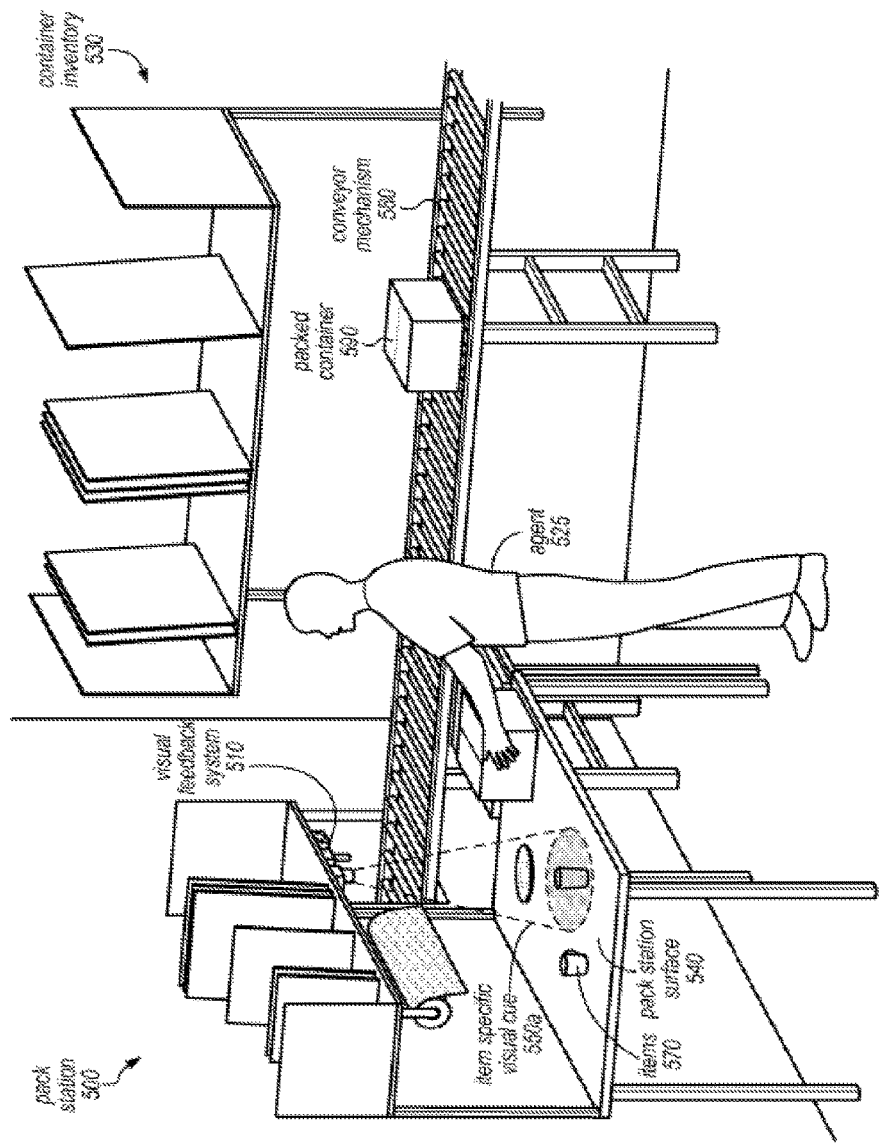
FIGS. 13A-13F are diagrams showing different examples of visual information being provided to an agent at a pack workstation.

In FIG. 13A, feedback system 510 has projected an item-specific visual cue 550*a* onto one of items 570 (as illustrated by the shaded area). This type of visual cue may convey one or more indications to agent 525. For example, a preferred task variation may involve picking up the item 570 in a particular way (e.g., with two hands on either side of the item 570). The visual cue, then, may include an indication of the preferred task variation. In the example above, the visual queue may include a representation of two hands, with one on either side of the item 570, indicating that the agent 525 should pick up the item 570 using two hands. Also, in some instances, a preferred next step in a material handling task may involve a particular item 570. For example, the preferred next step may involve placing a particular item 570 into a packing container. In this example, the visual queue on the item 570 may be an indication that the item is to be placed into the packing container next.

Figure 13B:
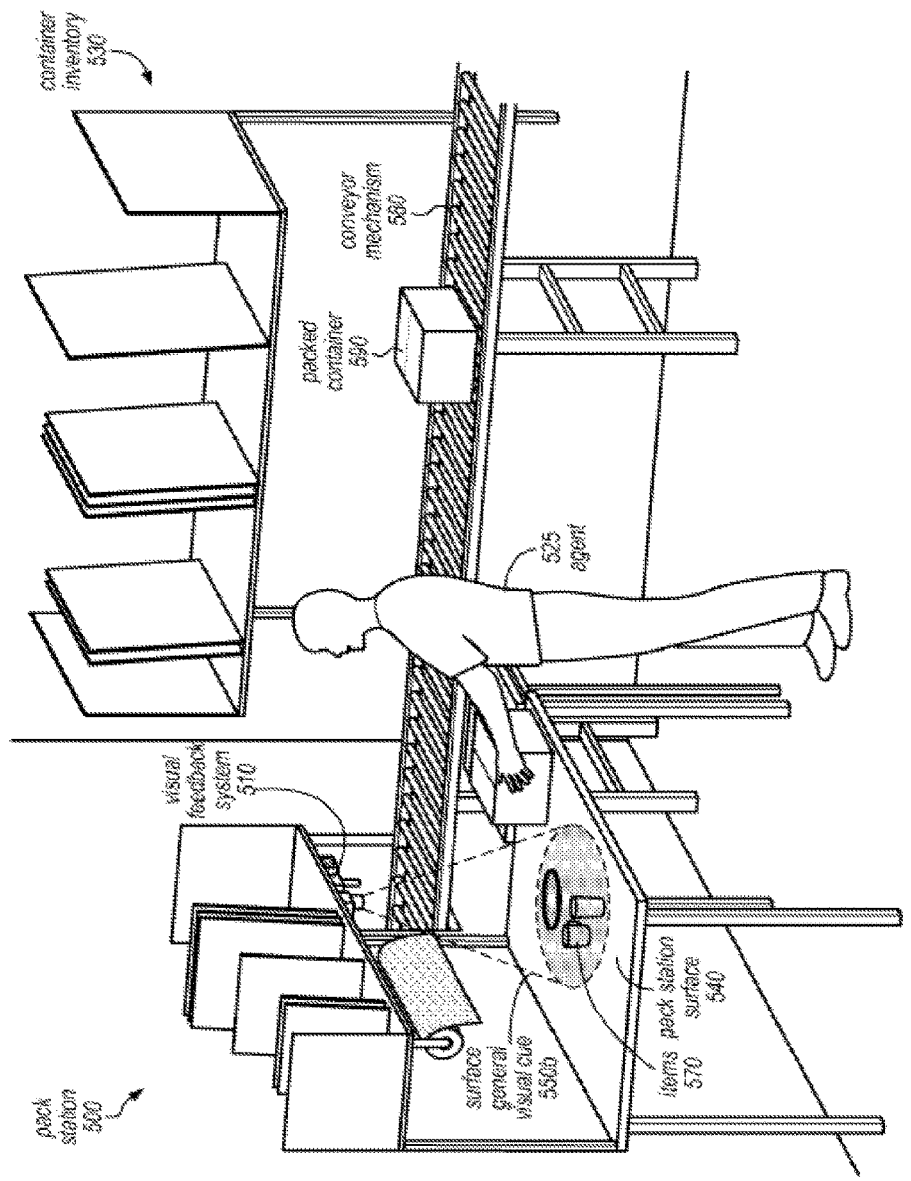

FIG. 13B illustrates another type of visual cue, a surface general cue 550*b*. For instance, in some examples, a visual cue may be projected onto a general or entire area of pack station surface 540. In some examples, the control system 202, as described herein, may determine that the agent 525 is engaged in a task variation that is highly correlated to error. A surface general cue 550*b* may be utilized to instruct an agent 525 engaged in such a task variation to stop. For example, the cue 550 may cause the pack station surface 540 to blink with a red or other noticeable color. Subsequent cues may instruct the agent on a preferred next sub-task or preferred task variation.

Figure 13C:
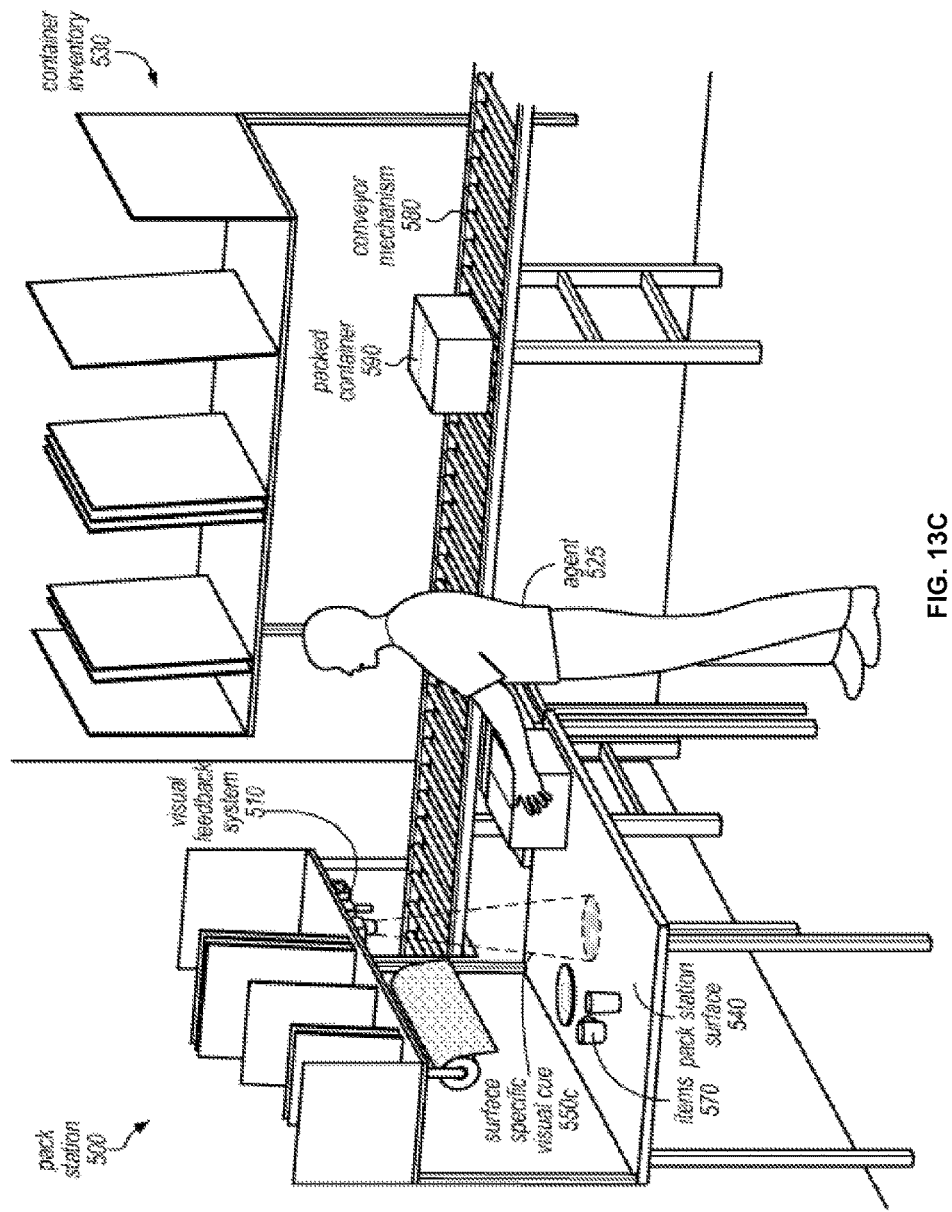

FIG. 13C illustrates another type of visual cue, a surface specific task cue 550*c*. A surface specific task cue may indicate that a particular object is missing, or should be located where the visual cue 550*c* is located. A surface specific task queue 550*c* may indicate the work station surface 540 location and, optionally, the object (e.g., item 570 or packing container) to be placed there. For example, a preferred next sub-task may involve the use of particular item 570. A surface specific task cue 550*c* may indicate the item 570. A position of the surface specific task queue 550*c* on the pack station surface 540 may indicate a preferred position of the item 570 according to a preferred task variation.

Figure 13D:
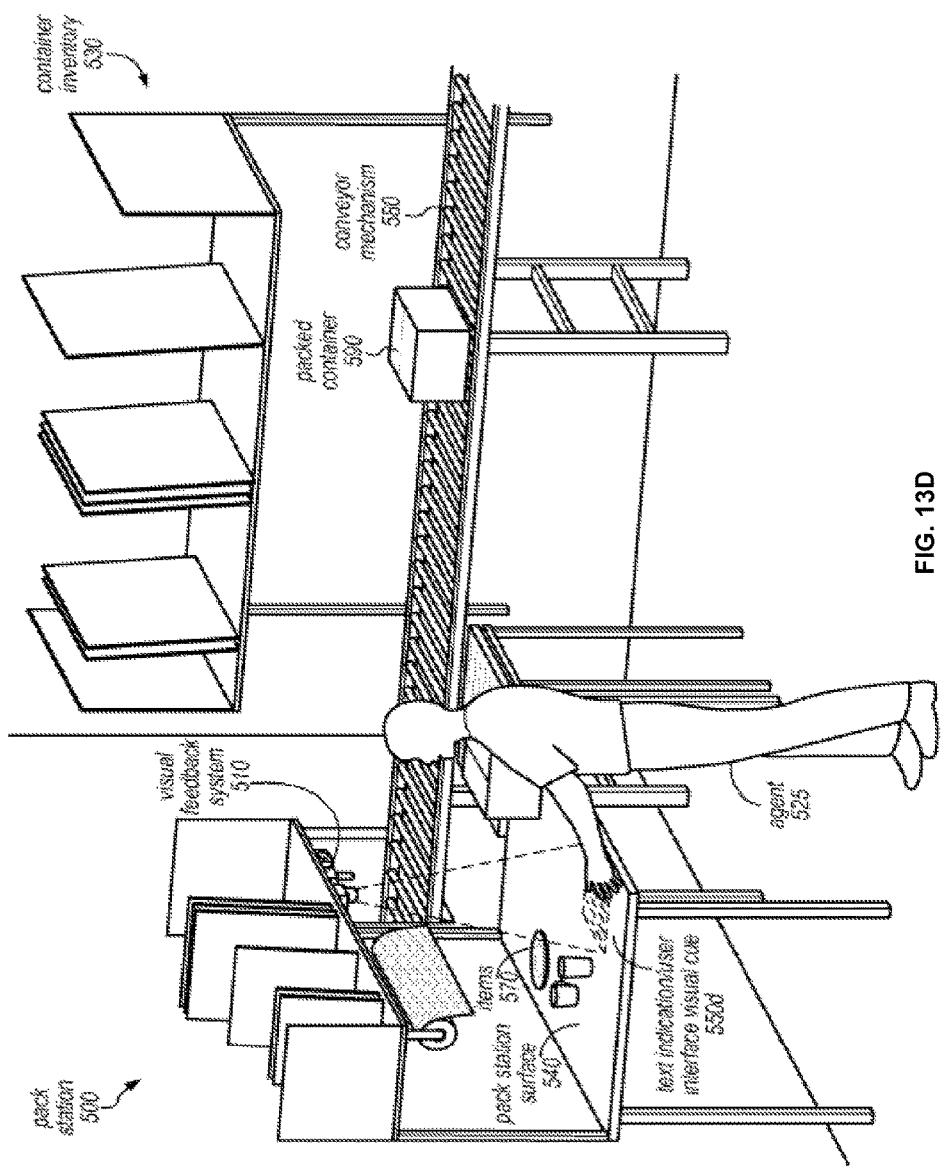

FIG. 13D illustrates another type of visual cue, a text indication/user interface visual cue 550*d*. Textual information may describe preferred sub-task orders and/or preferred task variations. In this way, agent 525 need not look away to a different monitor, book, or other information source to obtain information. Instead, agent 525 may maintain focus on the area in which agent 525 is currently working. User interface cue 550*d* may be a user interface which allows agent to provide input, such as by touching or hovering over one or more input objects within the projected user interface 550*d*. Again, agent 525 need not look away or interact with a different display system to provide input.

Figure 13E:
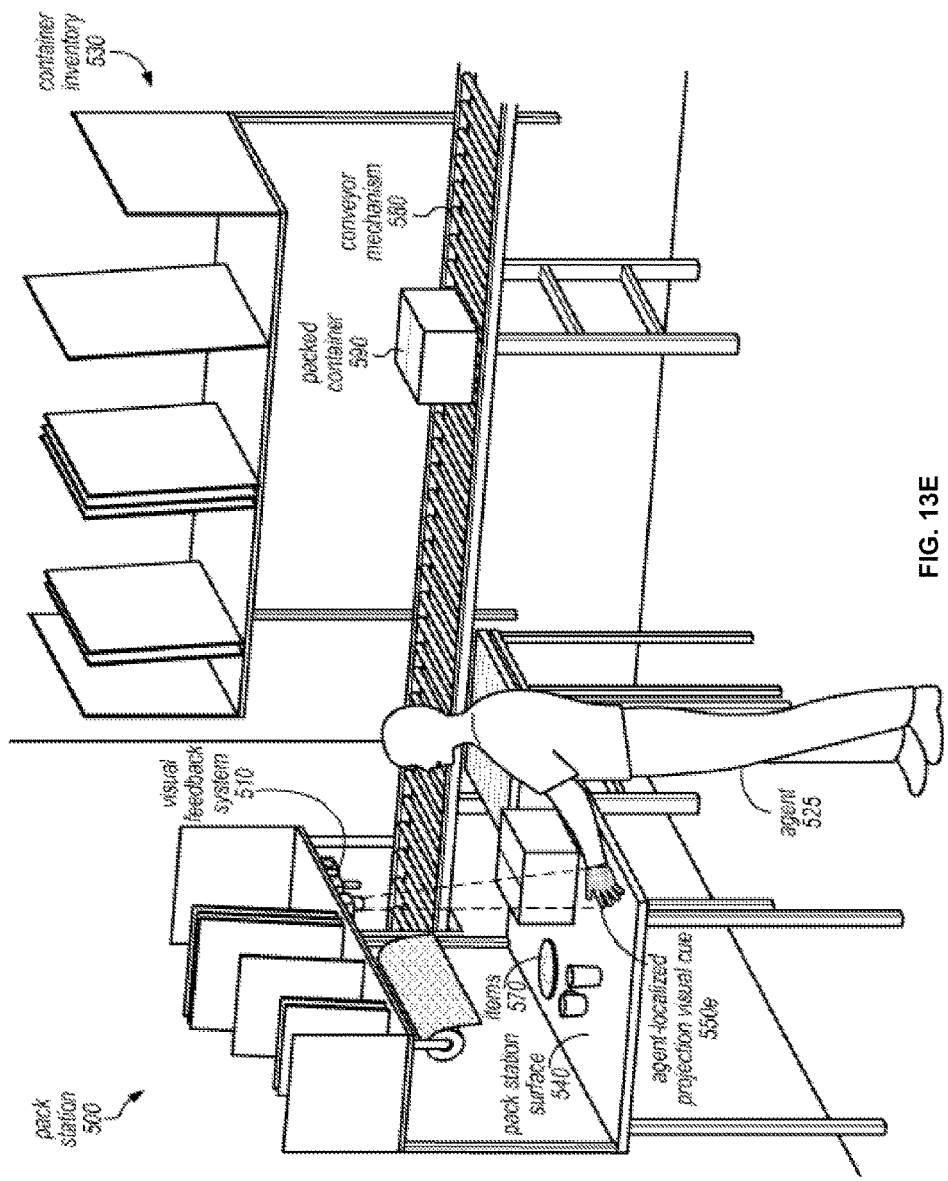
Figure 13F:
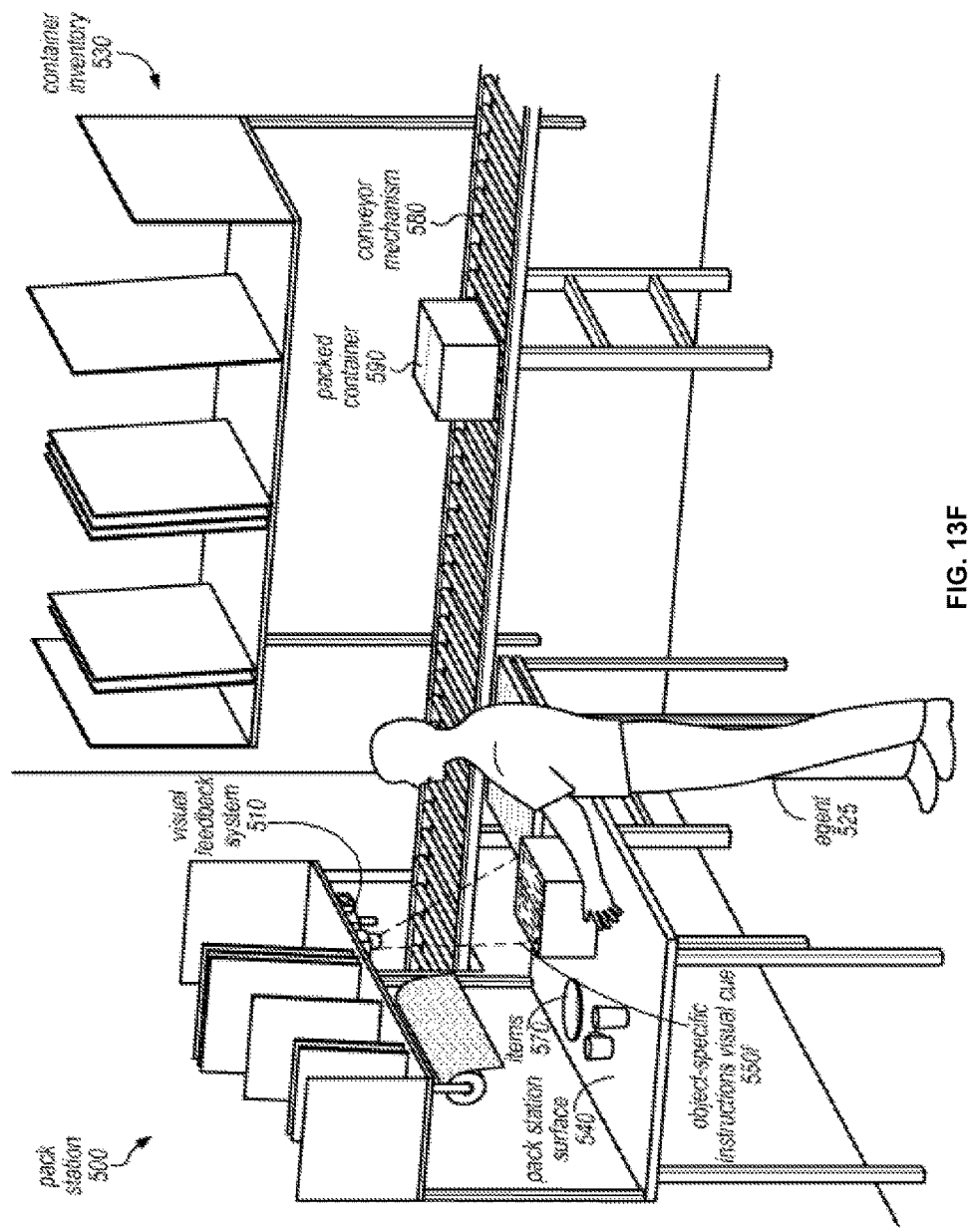

FIG. 13E illustrates another type of visual cue, an agent-localized visual cue 550*e*. An agent-localized visual cue may project the task cue onto the agent (e.g. agent's hand in FIG. 13E). The agent's position may be determined from depth video and/or from a sensor 306. In some examples, an agent-localized visual cue 550*e* may be utilized to demonstrate a preferred task variation. FIG. 13F illustrates another type of visual cue, an object-specific instruction visual cue 550*f*. An object-specific instruction visual cue 550*f* may be a projection of instructions or visual indication directly onto the object or portion of the object to which they pertain. For example, the object may be an item, packing container, etc. that is to be utilized in a next sub-task to be performed. The next sub-task may be determined, for example, as described herein. For instance, the object-specific instruction visual cue 550*f* may highlight portions of two items that are to be connected together, for example, according to a preferred task variation.

The examples of material handling task analysis and optimizing for workstations in materials handling facilities discussed above with regard to FIGS. 1-13F have been given in regard to a fixed or workstation-based visual task feedback system in a materials handling facility. Various other types or configurations of visual task feedback for workstations in materials handling facilities may implement these techniques. For example, rather than a control system like control system 202 discussed above, an individual control system may be implemented for an individual workstation. In some examples, computing systems or devices may be physically located near a workstation, or configured to communicate with sensors and/or projectors near a workstation from a central location. Different configurations or types of sensors for image data, geometric information, and/or weight may be implemented, as well as different configurations and types of projectors or other visual displays.

Figure 14:
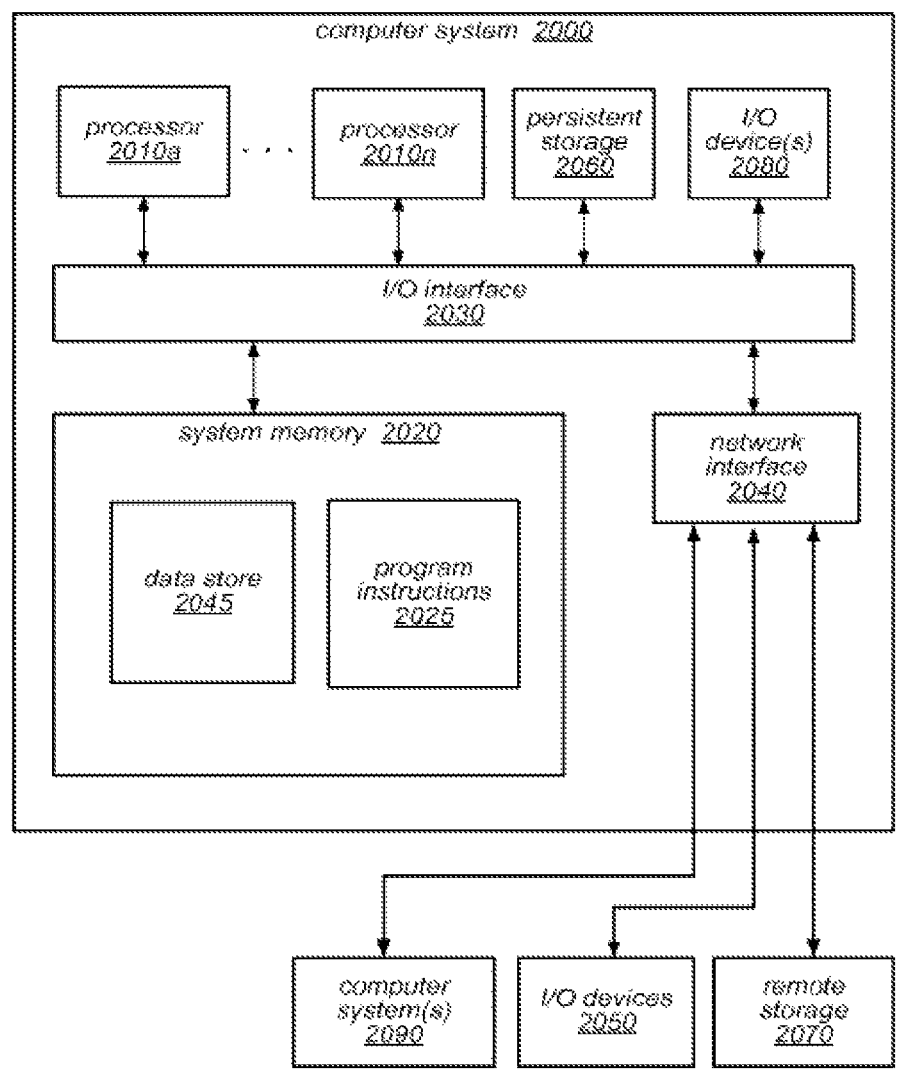
FIG. 14 is a block diagram showing an example computer system.

FIG. 14 is a block diagram showing an example computer system 2000. For example, the computer system 2000 may be used to implement all or a portion of the control system 202 described herein. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various examples, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various examples, processors 2010 may be general-purpose or embedded processors implementing any of a variety of instruction set architectures (ISAs), such as the x86, PowerPC, SPARC, or MIPS ISAs, or any other suitable I SA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.).

In the illustrated example, computer system 2000 also includes one or more persistent storage devices 2060 and/or one or more I/O devices 2080. In various examples, persistent storage devices 2060 may correspond to disk drives, tape drives, solid state memory, other mass storage devices, block-based storage devices, or any other persistent storage device. Computer system 2000 (or a distributed application or operating system operating thereon) may store instructions and/or data in persistent storage devices 2060, as desired, and may retrieve the stored instructions and/or data as needed.

Computer system 2000 includes one or more system memories 2020 that are configured to store instructions and data accessible by processor(s) 2010. In various examples, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various examples, program instructions 2025 may be encoded in platform native binary, any interpreted language such as Java™ byte-code, or in any other language such as C/C++, Java™, etc., or in any combination thereof. For example, in the illustrated example, program instructions 2025 include program instructions executable to implement the functionality of a control system, in different examples.

In some examples, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various examples. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some examples of computer system 2000 as system memory 2020 or another type of memory. In other examples, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some examples, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one example, I/O interface 2030 may be configured to coordinate I/O traffic between processor 2010, system memory 2020 and any peripheral devices in the system, including through network interface 2040 or other peripheral interfaces. In some examples, I/O interface 2030 may perform any necessary protocol, timing or other data transformations to convert data signals from one component (e.g., system memory 2020) into a format suitable for use by another component (e.g., processor 2010). In some examples, I/O interface 2030 may include support for devices attached through various types of peripheral buses, such as a variant of the Peripheral Component Interconnect (PCI) bus standard or the Universal Serial Bus (USB) standard, for example. In some examples, the function of I/O interface 2030 may be split into two or more separate components, such as a north bridge and a south bridge, for example. Also, in some examples, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 or various sensors, projectors or other components, for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 14 (e.g., displays, video cards, audio cards, peripheral devices, other network interfaces such as an ATM interface, an Ethernet interface, a Frame Relay interface, etc.)

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some examples, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described examples of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method for optimizing packing of items in a material handling facility comprising an image sensor and a depth sensor, the method comprising:

receiving a plurality of depth videos, each depth video including a corresponding performance of a material handling task that comprises packing at least one item for shipment;

for each of the plurality of depth videos, receiving classifier-training data comprising indications of identities of a plurality of sub-tasks of the material handling task and corresponding portions of the depth videos including the plurality of sub-tasks of the material handling task;

using the plurality of depth videos and the classifier-training data, training a classifier to determine identities of each of the plurality of sub-tasks of the material handling task from depth videos;

capturing with the imaging sensor and the depth sensor a captured depth video showing an agent performing the material handling task at a workstation;

determining a first identity of a first sub-task of the of the plurality of sub-tasks of the material handling task being performed by the agent, wherein the first identity of the first sub-task is determined by applying the classifier to the captured depth video;

receiving data describing the at least one item;

receiving data describing a box used by the agent to pack the at least one item;

determining a preferred next sub-task for the agent based at least in part on the at least one item and the box used, wherein the preferred next sub-task is selected from the plurality of sub-tasks to minimize a likelihood of error of the material handling task; and projecting an image indicating the preferred next sub-task at the workstation.

2. The method of claim 1, further comprising:

determining a preferred positioning of the agent during the material handling task based at least in part on the at least one item and the box used, wherein the preferred positioning of the agent is selected to minimize the likelihood of error of the material handling task; and projecting a second image at the workstation indicating the preferred positioning of the agent.

3. A material handling facility, the material handling facility comprising:

a depth video system; and a control system comprising at least one processor and operatively associated memory, wherein the control system is programmed to:

receive a plurality of depth videos, wherein each depth video includes a corresponding performance of a material handling task;

for each depth video of the plurality of depth videos, receive classifier-training data, wherein the classifier-training data comprises indications of identities of a plurality of sub-tasks of the material handling task and corresponding portions of the depth video including the plurality of sub-tasks;

using the plurality of depth videos and the classifier-training data, train a model to determine identities of the plurality of sub-tasks of the material handling task from depth videos;

receive, from the depth video system, a captured depth video of an agent performing the material handling task at a workstation, wherein the captured depth video comprises a plurality of captured sub-tasks; and determine a first identity of a first captured sub-task of the plurality of captured sub-tasks, wherein the first identity of the first captured sub-task is determined by applying the model to the captured depth video.

4. The material handling facility of claim 3, wherein the control system is further programmed to:
determine a preferred next sub-task; and
display an indication of the preferred next sub-task at the workstation.

5. The material handling facility of claim 4, wherein the control system is further programmed to:
receive a second plurality of depth videos, wherein each depth video of the second plurality of depth videos includes a corresponding performance of the material handling task, wherein each depth video of the second plurality of depth videos depicts a different order of performance of the plurality of sub-tasks of the material handling task;
for each of the second plurality of depth videos, receive a second indication of a time to complete the material handling task;
identify a first depth video of the second plurality of depth videos having a shorter time to complete the material handling task than the other depth videos of the second plurality of depth videos;
determine a first order of sub-tasks of the first depth video; and
determine the preferred next sub-task by selecting, from the first order of sub-tasks, a second sub-task immediately after a first sub-task of the first order of sub-tasks.

6. The material handling facility claim 4, further comprising a feedback system visual display, wherein the control system is further programmed to, using the feedback system visual display, generate the indication of the preferred next sub-task.

7. The material handling facility claim 6, wherein the control system is further programmed to generate the indication of the preferred next sub-task by displaying a visual cue on an object that is to be used in the preferred next sub-task.

8. The material handling facility claim 6, wherein the control system is further programmed to generate the indication of the preferred next sub-task by displaying a visual cue projected on a station surface, wherein the visual cue indicates a next item to be handled by the agent and a location on the station surface where the next item is to be handled according to a preferred task variation.

9. The material handling facility claim 6, wherein the control system is further programmed to generate the indication of the preferred next sub-task by displaying on a station surface text describing the preferred next sub-task.

10. The material handling facility of claim 4, wherein the control system is further programmed to:
receive a second plurality of depth videos, wherein each depth video of the second plurality of depth videos includes a corresponding performance of the material handling task;
for each of the second plurality of depth videos, receive a second indication of whether the performance of the material handling task included an error;
identify a second depth video of the second plurality of depth videos having a fewer number of errors in the performance of the material handling task than the other depth videos in the second plurality of depth videos;
determine a second order of sub-tasks of the second depth video; and
determine the preferred next sub-task by selecting, from the second order of sub-tasks of the second depth video, a second sub-task immediately after a first sub-task of the second order of sub-tasks.

11. The material handling facility claim 4, wherein the control system is further programmed to:
receive data describing at least one item being packed by the agent;
receive data describing a container used by the agent to pack the at least one item; and
determine the preferred next sub-task for the agent based at least in part on the data describing the at least one item being packed by the agent and the data describing the container used by the agent to pack the at least one item.

12. The material handling facility of claim 3, wherein the control system is further programmed to:
determine a preferred task variation for the first captured sub-task of the plurality of captured sub-tasks; and
display an indication of the preferred task variation for the first captured sub-task at the workstation.

13. The material handling facility of claim 3, wherein the control system is further programmed to:
receive a third plurality of depth videos, wherein each depth video of the third plurality of depth videos includes a corresponding performance of the material handling task;
for each of the third plurality of depth videos, receive a second indication of a time to complete the material handling task;
for each of the third plurality of depth videos, receive a third indication of a task variation;
determine a correlation between at least one task variation and a shorter time to complete the material handling task relative to at least one of the second indications of the time; and
using a feedback system, generate a fourth indication of the at least one task variation at a location visible to the agent.

14. The material handling facility of claim 3, wherein the control system is further programmed to:
receive a fourth plurality of depth videos, wherein each depth video of the fourth plurality of depth videos includes a corresponding performance of the material handling task;
for each of the fourth plurality of depth videos, receive a second indication of whether the performance of the material handling task included an error;

for each of the fourth plurality of depth videos, receive a third indication of a task variation;

determine a correlation between at least one task variation and erroneous performance of the material handling task; and using a feedback system, generate a fourth indication of the at least one task variation at a location visible to the agent.

15. The material handling facility claim 14, wherein the control system is further programmed to project the fourth indication of the at least one task variation onto an object to be utilized in a subsequent sub-task.

16. A method of managing a material handling task utilizing a depth video system, the method comprising:

receiving a plurality of depth videos, wherein each depth video of the plurality of depth videos includes a corresponding performance of the material handling task;

for each depth video of the plurality of depth videos, receiving classifier-training data, wherein the classifier-training data comprises indications of identities of a plurality of sub-tasks of the material handling task and corresponding portions of the depth video including the plurality of sub-tasks;

using the plurality of depth videos and the classifier-training data, training a model to determine identities of the plurality of sub-tasks of the material handling task from depth videos;

receiving, from the depth video system, a captured depth video of an agent performing the material handling task at a workstation; and determining a first identity of a first captured sub-task of the material handling task being performed by the agent, wherein the first identity is determined by applying the model to the captured depth video.

17. The method of claim 16, further comprising:

receiving a second plurality of depth videos, wherein each depth video of the second plurality of depth videos includes a corresponding performance of the material handling task, wherein each depth video of the second plurality of depth videos depicts a different order of performance of the plurality of sub-tasks of the material handling task;

for each of the second plurality of depth videos, receiving a second indication of a time to complete the material handling task;

identifying a first depth video of the second plurality of depth videos having a shorter time to complete the material handling task than the other depth videos of the second plurality of depth videos;

determine a first order of sub-tasks of the first depth video; and selecting, from the first order of sub-tasks a second sub-task positioned immediately after a first sub-task of the first order of sub-tasks.

18. The method of claim 16, further comprising:

receiving a third plurality of depth videos, wherein each depth video of the third plurality of depth videos includes a corresponding performance of the material handling task;

for each performance of the material handling task included in the third plurality of depth videos, receiving a second indication of whether the performance of the material handling task included an error;

identifying a first depth video of the third plurality of depth videos having a fewer number of errors in the performance of the material handling task than the other depth videos in the third plurality of depth videos;

determining a first order of sub-tasks of the first depth video; and selecting, from the first order of sub-tasks, a preferred next sub-task positioned immediately after a first sub-task of the first order of sub-tasks.

\* \* \* \* \*